United States Patent [19]

Frielingsdorf et al.

[11] 4,048,414
[45] Sept. 13, 1977

[54] MANUFACTURE OF OLEFIN POLYMERS

[75] Inventors: Hans Frielingsdorf, Bad Durkheim; Wolfgang Gruber, Frankenthal; Heinz Mueller-Tamm, Ludwigshafen, all of Germany

[73] Assignee: BASF Aktiengesellschaft, Ludwigshafen (Rhine), Germany

[21] Appl. No.: 657,863

[22] Filed: Feb. 13, 1976

[30] Foreign Application Priority Data

Mar. 4, 1975  Germany .............................. 2509261

[51] Int. Cl.$^2$ ............................ C08F 4/02; C08F 4/24
[52] U.S. Cl. .................................... 526/106; 252/451; 423/327; 423/329
[58] Field of Search ................ 526/106; 423/327, 329; 252/451

[56] References Cited

U.S. PATENT DOCUMENTS

| 3,127,370 | 3/1964 | Head ...................................... 526/106 |
| 3,225,023 | 12/1965 | Hogan et al. ......................... 526/106 |
| 3,434,912 | 3/1969 | Peri ........................................ 423/327 |
| 3,624,063 | 11/1971 | Witt ....................................... 526/106 |
| 3,900,457 | 8/1975 | Witt ....................................... 526/106 |

Primary Examiner—Alan Holler
Attorney, Agent, or Firm—Keil, Thompson & Shurtleff

[57] ABSTRACT

A process for the manufacture of olefin polymers by polymerization of monoolefins using a silicic xerogel/chromium trioxide catalyst obtained by (1) synthesizing a particulate silicic xerogel, (2) doping said xerogel with chromium trioxide or a chromium compound capable of converting to chromium trioxide under the conditions of stage (3) and (3) heating the resulting product in a gas stream containing oxygen. The silicic xerogel/chromium trioxide catalyst used is one which has been obtained by (1) synthesizing the silicic xerogel in the first stage by (1.1) starting with a silicic hydrogel having a relatively high solids content, (1.2) extracting water from said hydrogel by means of an alkanol and/or alkanone until the organic liquid absorbs no further water, (1.3) extracting the organic liquid used in stage (1.2) from the resulting dehydrated gel saturated with said organic liquid by means of a hydrocarbon or oxohydrocarbon until said hydrocarbon or oxohydrocarbon absorbs no further organic liquid from stage (1.2), and (1.4) drying the resulting dehydrated gel saturated with hydrocarbon or oxohydrocarbon (xerogel formation), and (2) doping said xerogel in the second stage with the desired amount of chromium from a solution of chromium trioxide in an alkanone or solution of a chromium compound capable of converting to chromium trioxide under the conditions of stage (3) in an alkanol or alkanone with evaporation of the solvent.

1 Claim, No Drawings

MANUFACTURE OF OLEFIN POLYMERS

The present invention relates to a process for the manufacture of olefin polymers by polymerization of $C_{2-8}$ α-monoolefins at temperatures of from 60° to 160° C and olefin pressures of from 0.5 to 40 bars using a silicic xerogel/chromium trioxide catalyst obtained by (1) synthesizing a particulate silicic xerogel having a particle diameter of from 10 to 2,000μm and in particular from 50 to 300μm, (2) doping said xerogel with from 0.1 to 10% by weight (based on the xerogel and calculated as chromium) of chromium trioxide or a chromium compound capable of converting of chromium trioxide under the conditions of stage (3) from a solution with evaporation of the solvent and (3) maintaining the resulting product at a temperature of from 400° to 1,100° C for from 10 to 1,000 minutes in an anhydrous stream of gas containing oxygen in a concentration of more than 10% v/v.

Various modifications of such processes are known, the silicic xerogel/chromium trioxide catalyst used being of a specific nature in each case.

Modifications are effected in the synthesis of the catalysts in order to achieve specific aims.

It is an object of the present invention to provide a catalytic process by means of which relatively low molecular weight polymers are produced, i.e. polymers having a relatively high melt index (giving easier processability) without the use of chain stoppers such as hydrogen or in the presence of comparatively small amounts of chain stoppers.

We have found that this object is achieved if, in the process defined above, a catalyst is used in which the silicic xerogel has been prepared in a specific manner from a silicic hydrogel having a very high solids content and the xerogel has been doped with the chromium component in a specific manner.

Thus, the present invention relates to a process for the manufacture of olefin polymers by polymerization of $C_{2-8}$ α-monoolefins, particularly ethylene, at temperatures of from 60° to 160° C and in particular from 80° to 110° C and olefin pressures of from 0.5 to 40 bars and in particular from 4 to 15 bars with the aid of a silicic xerogel/chromium trioxide catalyst obtained by (1) synthesizing a particulate silicic xerogel having a particle diameter of from 10 to 2,000μm and in particular from 50 to 300μm, (2) doping said xerogel with from 0.1 to 10% by weight (based on the xerogel and calculated as chromium) of chromium trioxide or a chromium compound capable of converting to chromium trioxide under the conditions of stage (3) from a solution with evaporation of the solvent and (3) maintaining the resulting product at a temperature of from 400° to 1,100° C for from 10 to 1,000 minutes in an anhydrous stream of gas containing oxygen in a concentration of more than 10% by volume. The process of the invention is characterized in that the silicic xerogel/chromium trioxide catalyst used is one which has been obtained by 1. synthesizing the silicic xerogel in the first stage by
    1.1. taking a silicic hydrogel having a solids content (calculated as silicon dioxide) of from 10 to 25% and preferably from 12 to 20% and more preferably from 14 to 20%, by weight,
    1.2. extracting water from said hydrogel by means of an organic liquid selected from the series of $C_{1-4}$ alkanols and/or $C_{3-5}$ alkanones until this organic liquid absorbs no further water,
    1.3. extracting said organic liquid from stage (1.2) from the resulting dehydrated gel saturated with said organic liquid from stage (1.2) by means of a hydrocarbon or oxohydrocarbon having a boiling point at 1 bar of from −20° to +40° C and a latent heat of vaporization of less than 7 kcal/mole and used in liquid form, until said hydrocarbon or oxohydrocarbon absorbs no further organic liquid from stage (1.2) and
    1.4. drying the resulting dehydrated gel saturated with said hydrocarbon or oxohydrocarbon at product temperatures of from 30° to 140° C and pressures of from 1 to 760 mm of Hg until no further loss of weight occurs at a temperature of 120° C in a vacuum of 10 mm of Hg for 30 minutes (resulting in xerogel formation) and
2. doping said xerogel in the second stage with the desired amount of chromium from a 0.05–5% w/w solution of chromium trioxide in a $C_{3-5}$ alkanone or of a chromium compound capable of converting to chromium trioxide under the conditions of stage (3) in a $C_{1-4}$ alkanol or $C_{3-5}$ alkanone with evaporation of the solvent, the solution of said chromium component not containing more than 20% and preferably not more than 5% by weight of water.

The following comments relate to the catalyst to be used in the process of the invention:

1. Stage 1
    1.1 Silicic hydrogels having the above relatively very high solids contents are known per se and it is thus unnecessary to describe them in detail in the specification. It may be emphasized, however, that in the present context those hydrogels are particularly suitable which have been synthesized by a process as described in German Published Application 2,103,243. It may be further mentioned that the silicic hydrogels which are suitable for the purposes of the invention are silicic hydrogels in the narrow sense of the term, i.e. water-containing coagulated silicic acid and also corresponding hydrogels in which up to 20 atomic percent of the silicon is replaced by hetero-atoms, particularly aluminum, zirconium and/or thorium.
    1.2. Extraction of the water from the silicic hydrogel with the aid of the above organic liquid may take place in conventional extracting equipment. Suitable apparatus includes soxhlet extractors and column extractors. Successful use has been made of the following organic liquids taken from the series of alkanols (in the order of decreasing efficiency but not decreasing economical value): t-butanol, isopropanol, ethanol and methanol. Of the alkanones, acetone has been found to be particularly satisfactory. It will be appreciated that the organic liquid may consist of one or more of the said individual substances, although in all cases the liquid should contain less than 5% and preferably less than 3% of water, by weight, prior to extraction.
    1.3. This extraction stage is governed by the same factors as extraction (1.2) as regards (i) the extracting equipment, (ii) the use of the extractant in the form of one or more individual substances and (iii) the water content of the extractant. Since the extractant must be present as a liquid during extraction, it will be appreciated that the conditions of temperature and pressure used during this operation must be selected so as to ensure that the extractant remains in the liquid state. Examples of suitable extractants are the following hydrocarbons or oxohydrocarbons (the boiling points being given in ° C at 1 bar, and the symbol "H" standing for the heat of vaporization at the boiling temperature in kcal/mole): isopentane (b.p. 27.8; H 5.9), butene-1 (b.p. −6.3; H 5.2), n-pentane (b.p. 36; H 6.2) and diethyl ether (b.p. 34.6; H 6.6). Diethyl ether and isopentane are particularly suitable.

1.4. Conversion of the gel saturated with hydrocarbon or oxohydrocarbon to the xerogel (drying) may be carried out in conventional drying equipment. The best results are obtained when drying is carried out at product temperatures of from 30° to 140° C and pressures of from 1 to 760 mm of Hg, an increase in temperature being associated with an increase in pressure and vice versa for vapor pressure reasons. Dryings may be accelerated, particularly at relatively high pressures, by the use of a stream of entraining gas such as nitrogen.

2. Stage 2

Doping of the xerogel with the chromium component may be conveniently carried out by suspending the xerogel in a solution of chromium trioxide or a chromium compound capable of converting to chromium trioxide under the conditions of stage (3) (the amounts being chosen so as to give the desired ratio of xerogel to chromium), the liquid ingredients, i.e. alkanone or alkanol and possibly water, being evaporated off with continual stirring to give as homogeneous a mixture as possible. It is most advantageous to operate at temperatures of from 20° to 150° C and pressures of from 10 to 760 mm of Hg during this stage. It is not critical if the xerogel doped with chromium component contains a certain amount of residual moisture (content of liquid ingredients not more than 20% and preferably not more than 10%, by weight, based on xerogel). Suitable chromium components for this purpose are, in particular, chromium trioxide and soluble salts of trivalent chromium with an organic or inorganic acid such as chromium acetate, oxalate, sulfate and nitrate. Particularly suitable salts are those with acids which convert completely to chromium (VI) on activation. Chromium compounds may also be used in the form of chelates, for example chromium acetyl acetonate.

3. Stage 3

This stage is for activating the catalyst. It may be carried out in conventional manner, i.e., in particular, under conditions ensuring that the chromium in the finished catalyst is at least partially in no other form than the hexavalent state. Suitable methods are described, for example, in German Published Application 1,520,467, sheet 3, line 11, to sheet 4, line 3.

It may be mentioned that the special feature of the process of the invention essentially resides in the novel catalyst used therein.

Apart from this special feature, the process may be carried out in virtually all conventional technological embodiments, for example as a batchwise, intermittent or continuous process, which may be, for example, a suspension polymerization, solution polymerization or dry-phase polymerization process. The greatest advantages are achieved in the first-mentioned and last-mentioned cases. The said embodiments, in other words the modifications of the polymerization of the olefins according to Phillips, are well known from the literature (see for example German Patent 1,051,004 giving the basic principles and also the published developments thereof) and in practice, and it is therefore unnecessary to go into any details.

However, it may be pointed out that the novel process is suitable for the homopolymerization and copolymerization of $C_{2-8}$ α-monoolefins. It is particularly suitable for the manufacture of homopolymers of ethylene. As regards the manufacture of copolymers of ethylene with α-monoolefins or the manufacture of homopolymers of α-monoolefins, particularly suitable α-monoolefins are propene, butene-1, 4-methylpentene-1, hexene-1 and octene-1. It is not generally necessary, in the process of the invention, to use hydrogen as chain stopper, although such a chain stopper may be used in relatively small amounts if desired.

Finally, mention may be made of the fact that in the polymerization of olefins by the process of the invention, a considerable advantage may be achieved on account of the fact that the catalysts to be used therein are obtainable having a particularly high productivity. Thus the amount of catalyst ingredients in the polymer is so low that it has no disturbing effect and removal thereof, which would require a separate step, is generally unnecessary.

EXAMPLE 1

PREPARATION OF CATALYST

This is carried out by
1. synthesizing, in a first stage, a silicic xerogel by
  1.1. taking a silicic hydrogel containing 15% by weight of solids (calculated as silicon dioxide),
  1.2. extracting water from this hydrogel by means of isopropanol (anhydrous) in a soxhlet extractor until the isopropanol absorbs no further water,
  1.3. extracting the isopropanol from the dehydrated gel saturated therewith by means of liquid isopentane (anhydrous) until the isopentane absorbs no further isopropanol and
  1.4. drying the resulting dehydrated gel saturated with isopentane (at 100 mm of Hg and 120° C for 20 hours) until no further loss of weight occurs at 120° C under a vacuum of 10 mm of Hg over 30 minutes (xerogel formation), and isolating the sieve fraction of from 100 to 300μm, (2) doping this xerogel, in the second stage, with the desired amount of chromium trioxide (1% by weight, based on the xerogel and calculated as chromium) from a 1% w/w solution of chromium trioxide in acetone (containing 3% by weight of water) with evaporation of the solvent (using a stirred vessel provided with suction means, the temperature rising from boiling temperature to 120° C) and (3) maintaining the resulting product, in a third stage, at a temperature of 720° C for 90 minutes in a fluidized bed produced by moisture-free air.

POLYMERIZATION

Use is made of a stirred vessel (useful capacity 1 l), in which 70 g of coarse-powdered polyethylene are placed to form a dry bed, which polyethylene has been mixed with 0.07 g of the catalyst obtained as described above.

Polymerization is carried out at a constant ethylene pressure of 35 bars and a temperature of 106° C over a period of 2 hours.

There are obtained, over 2 hours, 3,400 parts by weight of polyethylene per part by weight of catalyst, which polyethylene has an HLMI (melt index MFI 190/20 [g/10 min] according to ASTM 1238-65 T) of 29.

COMPARATIVE TEST

The above polymerization is carried out under identical conditions except that in place of the catalyst of the invention a commercially available catalyst is used such as is employed industrially in the polymerization of ethylene, which catalyst has also been formed from a silicic xerogel and contains 1% by weight based on the xerogel and calculated as chromium) of chromium trioxide.

There are obtained, over 2 hours, 1,500 parts by weight of polyethylene per part by weight of catalyst, which polyethylene has an HLMI of 6.

EXAMPLE 2

PREPARATION OF CATALYST

This is carried out by
1. synthesizing, in a first stage, a silicic xerogel by
   1.1. taking a silicic hydrogel containing 17% by weight of solids (calculated as silicon dioxide),
   1.2. extracting water from said hydrogel by means of acetone (water content less than 1% by weight) in a soxhlet extractor until the acetone absorbs no further water,
   1.3. extracting the acetone from the resulting dehydrated acetone-saturated gel by means of liquid diethyl ether until said diethyl ether absorbs no further acetone, and
   1.4. drying the resulting dehydrated gel saturated with said organic liquid (at 100 mm of Hg and 120° C for 20 hours) until there is no further loss of weight over 30 minutes at 120° C under a vacuum of 10 mm of Hg (xerogel formation), and then isolating the sieve fraction of from 100 to 300μm,
2. doping this xerogel, in a second stage, with the desired amount of chromium trioxide (1% by weight, based on the xerogel and calculated as chromium) from a 0.7% w/w solution of chromium trioxide in acetone (containing 3% by weight of water) with evaporation of the solvent (using a stirred vessel provided with suction means, the temperature rising from boiling temperature to 120° C) and
3. maintaining te resulting product, in a third stage, at a temperature of 800° C for 70 minutes in a moisture-free stream of oxygen.

POLYMERIZATION

Use is made of a stirred vessel (useful capacity 10 l), in which 3,130 g of anhydrous isopentane (as suspending agent) are placed, this having been previously mixed with 0.2 g of the catalyst obtained as described above.

Polymerization is carried out at a constant ethylene pressure of 40 bars and a temperature of 150° C over a period of 2 hours.

There are obtained, over 2 hours, 10,400 parts by weight of polyethylene per part by weight of catalyst, which polyethylene has an HLMI (melt index MFI 190/20 [g/10 min] according to ASTM 1238-65 T) of 19.

COMPARATIVE TEST

The above polymerization is carried out under identical conditions except that in place of the catalyst of the invention a commerically available catalyst as used for large-scale polymerization of ethylene is used, this catalyst also having been formed from a silicic xerogel and containing 1% by weight (based on the xerogel and calculated as chromium) of chromium trioxide.

There are obtained, over 2 hours, 7,200 parts by weight of polyethylene per part by weight of catalyst, which polyethylene has an HLMI of 7.

We claim:

1. A process for the manufacture of olefin by polymerization of $C_{2-8}$ monoolefins at temperatures of from 60° to 160° C and olefin pressures of from 0.5 to 40 bars using a silicic xerogel/chromium trioxide catalyst which has been obtained by (1) synthesizing a particulate silicic xerogel having a particle diameter of from 10 to 2,000μm, (2) doping said xerogel with from 0.1 to 10% by weight, based on the xerogel and calculated as chromium, of chromium trioxide or a chromium compound capable of converting to chromium trioxide under the conditions at stage (3), from a solution with evaporation of the solvent, and (3) finally maintaining the resulting product at a temperature of from 400° to 1,100° C for from 10 to 1,000 minutes in an anhydrous stream of gas containing oxygen in a concentration of more than 10% by volume, wherein the silicic xerogel/chromium trioxide catalyst is one which has been obtained by
    1. synthesizing the silicic xerogel in the first stage by
        1.1. taking a silicic hydrogel having a solids content, calculated as silicon dioxide, of from 10 to 25%,
        1.2. extracting water from said hydrogel by means of an organic liquid selected from the series of $C_{1-4}$ alkanols and/or $C_{3-5}$ alkanones until said organic liquid absorbs no further water,
        1.3. extracting said organic liquid from stage (1.2) from the resulting dehydrated gel saturated with said organic liquid from stage (1.2) by means of hydrocarbon or oxohydrocarbon having a boiling point at 1 bar from −20° to +40° C and a latent heat of vaporization of less than 7 kcal/mole and used in liquid form, until said hydrocarbon or oxohydrocarbon absorbs no further organic liquid from stage (1.2) and
        1.4. drying the resulting dehydrated gel saturated with said hydrocarbon or oxohydrocarbon at product temperatures of from 30° to 140° C and pressures of from 1 to 760 mm of Hg until no further loss of weight occurs at a temperature of 120° C under vacuum of 10 mm Hg in a period of 30 minutes, thereby producing a xerogel, and
    2. doping said xerogel in the second stage with the desired amount of chromium from a 0.05-5% w/w solution of chromium trioxide in a $C_{3-5}$ alkanone or of a chromium compound capable of converting to chromium trioxide under the conditions of stage (3) in a $C_{1-4}$ alkanol or $C_{3-5}$ alkanone with evaporation of the solvent, the solution of said chromium component not containing more than 20% by weight of water.

* * * * *